(12) United States Patent
Funk et al.

(10) Patent No.: US 7,497,076 B2
(45) Date of Patent: Mar. 3, 2009

(54) EMISSION CONTROL SYSTEM

(75) Inventors: Werner Funk, Olivenhain, CA (US);
Phillip Roberts, Long Beach, CA (US)

(73) Assignee: Extengine Transport Systems,
Fullerton, CA (US)

( * ) Notice: Subject to any disclaimer, the term of this patent is extended or adjusted under 35 U.S.C. 154(b) by 49 days.

(21) Appl. No.: 11/228,551

(22) Filed: Sep. 16, 2005

(65) Prior Publication Data

US 2006/0037309 A1    Feb. 23, 2006

Related U.S. Application Data

(63) Continuation-in-part of application No. 10/431,270, filed on May 6, 2003, now Pat. No. 7,065,958.

(60) Provisional application No. 60/378,861, filed on May 7, 2002.

(51) Int. Cl.
*F01N 3/00* (2006.01)

(52) U.S. Cl. .............................. 60/286; 60/295; 60/297; 60/301; 60/303

(58) Field of Classification Search .................. 60/274, 60/276, 286, 295, 301, 303, 289, 297
See application file for complete search history.

(56) References Cited

U.S. PATENT DOCUMENTS

| | | | |
|---|---|---|---|
| 4,155,986 A | 5/1979 | Gladden | |
| 4,188,364 A | 2/1980 | Gladden | |
| 4,403,473 A | 9/1983 | Gladden | |
| 4,788,648 A | 11/1988 | Ferretti et al. | |
| 5,116,579 A | 5/1992 | Kobayashi et al. | |
| 5,224,346 A | 7/1993 | Berriman et al. | |
| 5,524,432 A * | 6/1996 | Hansel | ........................ 60/274 |
| 5,540,047 A | 7/1996 | Dahlheim et al. | |
| 5,609,026 A | 3/1997 | Berriman et al. | |
| 5,628,186 A | 5/1997 | Schmelz | |
| 5,643,536 A | 7/1997 | Schmelz | |
| 5,809,774 A | 9/1998 | Peter-Hoblyn et al. | |
| 5,809,775 A | 9/1998 | Tarabukski et al. | |
| 5,845,487 A | 12/1998 | Fraenkle et al. | |
| 5,992,141 A | 11/1999 | Berriman et al. | |
| 6,082,102 A | 7/2000 | Wissler et al. | |

(Continued)

FOREIGN PATENT DOCUMENTS

WO    WO2007035354    3/2007

OTHER PUBLICATIONS

J. Willand et al., Selective Non-Catalytic NOx-Reduction in Diesel Engines Using Aqueous Urea, SAE Technical Paper Series, 982651, Int'l Fall Fuels & Lubricants Mtg, Oct. 1998.

(Continued)

*Primary Examiner*—Binh Q Tran
(74) *Attorney, Agent, or Firm*—Sheppard Mullin; David E. Heisey

(57) ABSTRACT

An emission control system is provided for an engine for reducing NOx emissions, the system comprising an ammonia injector, a controller for controlling the ammonia injector and a catalyst, wherein the controller includes a transmitter for transmitting information regarding the amount of ammonia used and the amount of NOx reduced.

18 Claims, 5 Drawing Sheets

U.S. PATENT DOCUMENTS

| | | | |
|---|---|---|---|
| 6,119,448 | A | 9/2000 | Emmerling et al. |
| 6,192,676 | B1 * | 2/2001 | Zurbig et al. ................ 60/286 |
| 6,279,603 | B1 | 8/2001 | Czarnik et al. |
| 6,293,097 | B1 | 9/2001 | Wu et al. |
| 6,357,226 | B2 | 3/2002 | Borland |
| 6,367,320 | B1 | 4/2002 | Kueper et al. |
| 6,401,455 | B1 | 6/2002 | Mathes et al. |
| 6,415,602 | B1 | 7/2002 | Patchett et al. |
| 6,427,439 | B1 | 8/2002 | Xu et al. |
| 6,442,922 | B1 | 9/2002 | Rusch |
| 6,502,390 | B2 | 1/2003 | Goerigk et al. |
| 6,532,736 | B2 | 3/2003 | Hammerle et al. |
| 6,601,033 | B1 | 7/2003 | Sowinski |
| 6,601,385 | B2 | 8/2003 | Verdegan et al. |
| 6,637,196 | B1 * | 10/2003 | Tost ............................ 60/286 |
| 6,725,651 | B2 | 4/2004 | Itoh et al. |
| 6,755,014 | B2 * | 6/2004 | Kawai et al. ................ 60/286 |
| 6,778,888 | B2 | 8/2004 | Cataldo |
| 6,915,629 | B2 | 7/2005 | Szymkowicz |
| 7,117,079 | B2 * | 10/2006 | Streichsbier et al. ........ 701/114 |
| 2003/0213234 | A1 | 11/2003 | Funk et al. |

OTHER PUBLICATIONS

Nicole Fritz et al., On-Road Demonstration of NOx Emission Control for Diesel Trucks with SINOx Urea SCR System, SAE Technical Paper Series, 1999-01-0111, Mar. 1, 1999.

C.J. Brodrick et al., Urea-SCR System Demonstration and Evaluation for Heavy-Duty Disel Trucks, SAE Technical Paper Series, 1999-01-3722, Nov. 15, 1999.

Guy R. Chandler, et al., An Integrated SCR and Continously Regenerating Trap System to Meet Future NOx and PM Legislation, 2000-10-0188, SAE 2000 World Congress, Mar. 6, 2000.

J. Gieshoff et al., Improved SCR Systems for Heavy Duty Applications, SAE Technical Paper Series, 2000-01-0189, SAE 2000 World Congress, Mar. 6, 2000.

William R. Miller, et al., The Development of Urea-SCR Technology for US Heavy Duty Trucks, 2000-01-0190, SAE 2000 World Congress, Mar. 6, 2000.

Magdi Khair, et al., Integration of Exhaust Gas Recirculation, Selective Catalytic Reduction, Diesel Particulate Filters, and Fuel-Borne Catalyst for NOx/PM Reduction, Jun. 19, 2000.

* cited by examiner

EMISSION CONTROL SYSTEM

REFERENCE TO RELATED APPLICATIONS

This application is a Continuation-In-Part of U.S. patent application Ser. No. 10/431,270, filed May 6, 2003, now U.S. Pat. No. 7,065,958 which claims priority from U.S. Provisional Application Ser. No. 60/378,861, filed May 7, 2002, the contents of which are incorporated herein by reference in their entirety.

FIELD OF THE INVENTION

The present invention is directed generally to emission control systems, and more particularly to, an emission control system for decreasing the emissions of compression and spark ignition engines.

BACKGROUND OF THE INVENTION

Nitrogen oxide (NOx) emissions contribute significantly to photochemical smog and also to acid rain. NOx includes both nitrogen oxide (NO) and nitrogen dioxide ($NO_2$), both of which will be referred to as NOx. NOx is generated during the combustion of fossil fuels and a major generator of NOx is the diesel engine. Currently, new emissions standards for diesel engines are being proposed. For example, the European Euro-5 and the proposed US-2007 standards require a significant reduction in both NOx and particulate matter (PM) emissions.

In addition, diesel emissions have been classified as Toxic Air Contaminants (TACs) in the State of California. Under the Federal Clean Air Act, California must meet certain clear air requirements established by the Federal Government in order to qualify for federal highway funding. It is unlikely that those guidelines can be met without reducing emissions from mobile sources. Diesel mobile sources produce a disproportionate percentage of all emissions due to the inherent nature of the fuel and the engine.

In response, diesel engine manufacturers are developing systems to treat the exhaust stream of their diesel engines. Most of these solutions, however, make a clear trade off between emissions and fuel consumption. Some proposed systems are even associated with a distinct fuel penalty. Of course, fuel efficiency is extremely important, as the engine operator incurs an increased operational cost.

Another problem is that diesel engines typically last longer than other types of engines, and older engines produce more toxic emissions than newer engines.

Therefore, there exists a need for an emission control system that can reduce both NOx and PM emissions without incurring a fuel penalty, and that can be retrofitted to existing diesel engines.

SUMMARY OF THE INVENTION

The present invention reduces emissions generated by a diesel engine by injecting ammonia into the exhaust stream, and can be incorporated into new engine designs or retrofitted to existing engines. The principles of the present invention involve an emission control system for metering a reagent into a flowing medium, for instance for introducing ammonia into an exhaust stream containing NOx. The present invention can adjust a concentration of the reagent, such as ammonia, even when an abrupt change occurs in the concentration of NOx in the exhaust stream. Therefore, even if the discharge amount and the concentration of NOx change abruptly, an optimum amount of ammonia can be supplied, and the NOx in the exhaust stream can be substantially eliminated.

One aspect of the present invention involves an emission control system for an engine for reducing NOx emissions, comprising an ammonia injector, a controller for controlling the ammonia injector and a catalyst, wherein the controller includes a transmitter for transmitting information regarding the amount of ammonia used and the amount of NOx reduced. The transmitter is an RF transmitter configured to transmit the information to remote locations such as government agencies. The information transmitted by the transmitter is employed to determine a proper distribution of pollution credits to encourage compliance.

The controller calculates an amount of NOx reduced based on an amount of ammonia injected by the ammonia injector, wherein information concerning the amount of NOx reduced is employed to monitor an amount of ammonia used, such that it is possible to determine a time when the ammonia will be exhausted. The controller notifies an appropriate party to fill the tank when the ammonia is nearly exhausted, and also calculates and maintains a running account of an amount of ammonia used and an amount of ammonia remaining in the tank.

A further aspect of the invention involves an emission control system for and engine for reducing NOx emissions, comprising an ammonia tank, an ammonia injector and a controller for controlling the ammonia injector, wherein the controller includes a transmitter for transmitting information regarding the amount of ammonia used and the amount of NOx reduced. The controller determines a pressure in the ammonia tank to ensure that it contains ammonia, wherein a lack of pressure in the ammonia tank indicates that the tank is substantially empty. Additionally, the controller determines a pulse-width and frequency of an opening and closing of the ammonia injector, as well as a pressure of the ammonia, in order to calculate an amount of ammonia being used. According to some embodiments, the ammonia tank is refilled when there remains an amount of ammonia in the tank.

These and other features and advantages of the present invention will be appreciated from review of the following detailed description of the invention, along with the accompanying figures in which like reference numerals refer to like parts throughout.

DETAILED DESCRIPTION OF THE INVENTION

Figure 1:
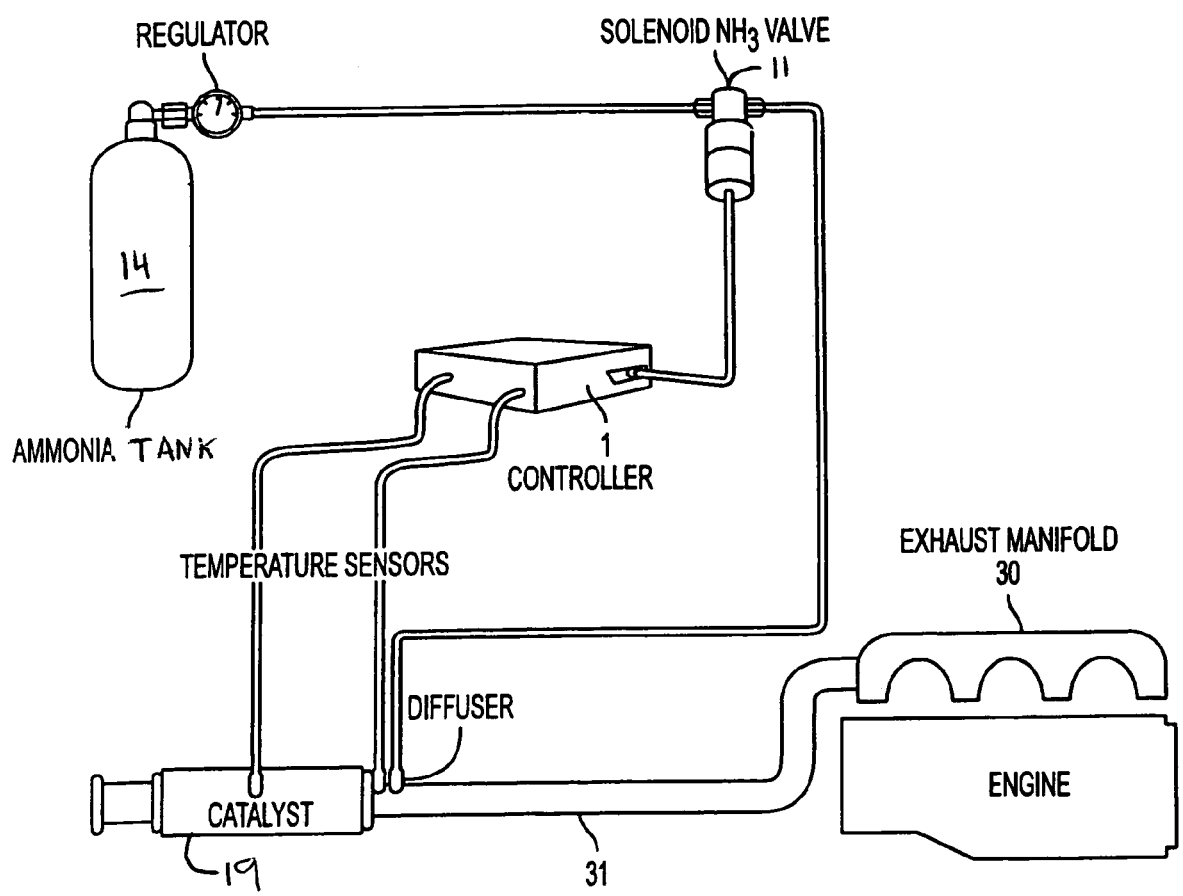
FIG. 1 is a schematic illustration of a first embodiment of an emission control system constructed according to the present invention.

In the following paragraphs, the present invention will be described in detail by way of example with reference to the attached drawings. Throughout this description, the preferred embodiment and examples shown should be considered as exemplars, rather than as limitations on the present invention. As used herein, "the present invention" refers to any one of the embodiments of the invention, or equivalents thereof.

The present invention provides an emission control system for reducing NOx emitted from an engine, by employing a controller that communicates with a plurality of sensors that provide information to the controller. The controller then regulates an amount of ammonia that is introduced into the engine's exhaust gas stream by analyzing the information provided by the plurality of sensors.

The present invention can be retrofitted to existing engines, or installed as original equipment. One embodiment of the present invention comprises a diesel engine NOx and PM emission reduction retrofit system. By incorporating a "retrofit" system, the engine owner will achieve immediate and significant reductions in NOx and PM emissions on most diesel, natural gas, and "lean-burn" vehicles, ships, generators, and other equipment that emit NOx. Another embodiment of the present invention may be incorporated into a new engine design.

The present invention may use any form of ammonia, such as urea, aqueous ammonia, or gaseous ammonia, or liquid ammonia. The ammonia is introduced into the exhaust stream to reduce NOx and combines an electronic controlled diffusion system together with a Selective Catalytic Reduction ("SCR") component. A noticeable reduction in the NOx emission of a diesel motor can be achieved by applying SCR. In the SCR method, ammonia ($NH_3$) is injected into the exhaust stream as a reduction agent. The present invention has already demonstrated its ability on diesel engines to reduce NOx by 75% or more and PM by 40% or more, and CO and HC by 70% or more over most engine operating parameters. In addition, the present invention may also reduce ammonia slip, which is the unintentional emission of ammonia in the exhaust stream. Moreover, simultaneous with the NOx reduction, hydrocarbons (HC), Carbon monoxide (CO) and particulate matter (PM) are reduced.

The ability of ammonia as a reductant to achieve significant reductions of NOx has been well established for over 35 years in stationary power generator applications. The uniqueness of the present invention is its safe and cost effective ability to create substantial reductions of mobile, as well as fixed source NOx emissions.

A preferred embodiment of the invention includes a controller that directs an ammonia injector to emit precise amounts of ammonia into an engine's exhaust stream. This embodiment also comprises a combination of a selective non-catalytic reduction (SNCR), and the above-mentioned selective catalytic reduction (SCR) to create a NOx reduction system that increases the reactive temperature range between the NOx and ammonia from anywhere between 275° Fahrenheit (F.) to about 1200° F. Ammonia is injected into the exhaust system between an engine exhaust manifold and a SCR (selective catalytic reaction) converter, and employs a mixer element to mix the ammonia with the exhaust gases. Preferably, the mixer element comprises a group of blades, fins, tabs, or other suitable components to mix the ammonia with the exhaust gases.

In the preferred embodiment, ammonia injection occurs at a location where the exhaust gases do not exceed the auto ignition temperature of ammonia, which is about 1200° F., but at a high enough temperature to cause reaction of the ammonia with NO and $NO_2$ (NOx) in the exhaust system prior to the exhaust gases reaching the SCR catalyst. By being able to precisely control the amount and timing of ammonia injected necessary to reduce NOx, without any waste or slippage, that is without excess ammonia exiting the exhaust system, the size and weight of the on-board ammonia storage tank can be greatly reduced—in other words, many tank size options are available depending on user requirements. Thus, the safety concern of carrying very large ammonia storage tanks has been virtually eliminated.

Figure 2:
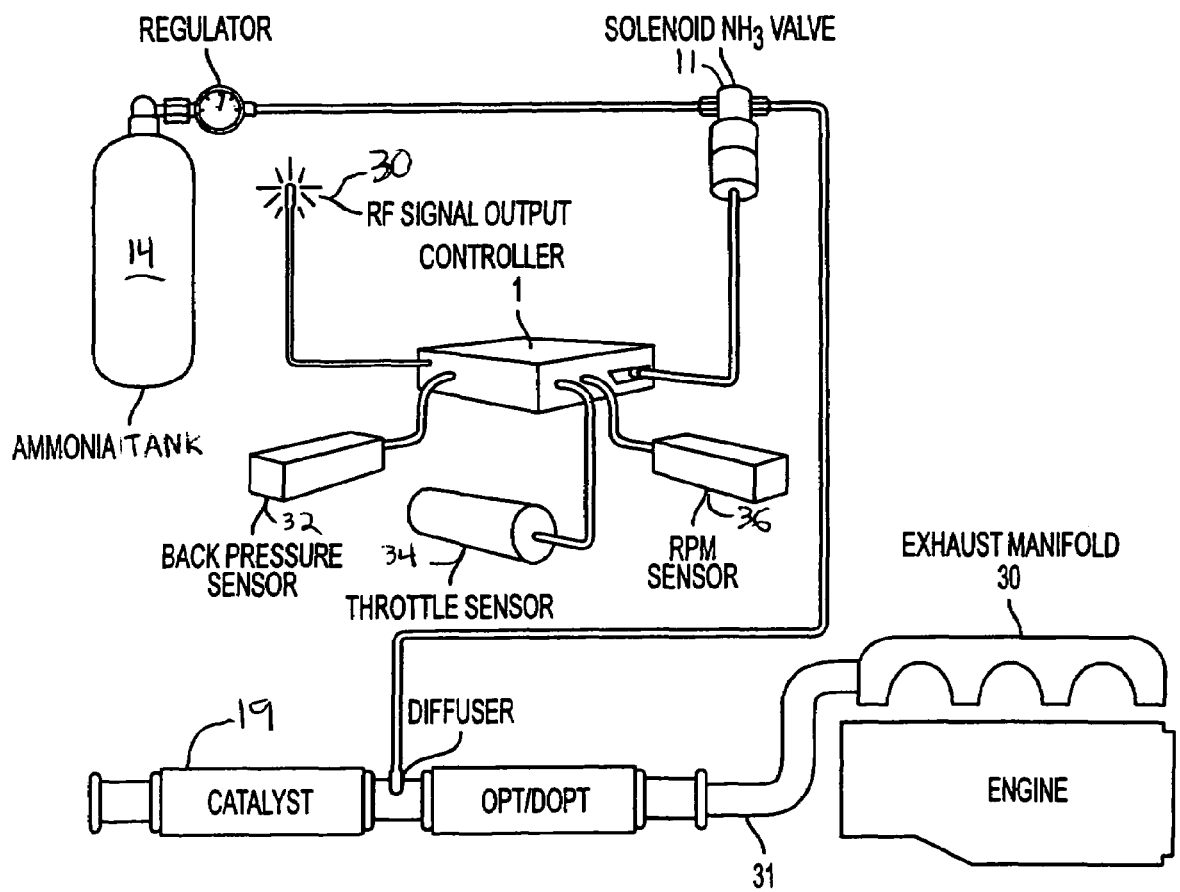
FIG. 2 is a schematic illustration of a second embodiment of an emission control system constructed according to the present invention.

Referring to FIGS. 1-2, the emission control system includes a computerized electronic controller 1 that varies the amount of ammonia injected from an ammonia tank 14 into exhaust pipe 31 upstream of reduction catalyst 19 in proportion to the amount of NOx being produced by the engine at any given time. Controller 1 is responsible for controlling the amount of ammonia being injected for NOx reduction, while minimizing any ammonia slip, and may also include circuitry for a redundant fail-safe and OBD (On Board Diagnostic) system including a warning light and a data port. The controller calculates the correct amount of ammonia needed, by analyzing the information supplied by the various sensors, together with the engine speed information, and compares these values with the appropriate point of the injection map that is contained in the vehicle's original engine control system. The amount of ammonia being injected is controlled by a valve 11 such as an ammonia metering solenoid or other suitable valve that introduces the ammonia into the exhaust system. Controller 1 preferably includes at least one general purpose digital computer with associated computer code, or logic for analyzing the data received from the sensors, and instructing the various components communicating with the controller 1.

Advantageously, the injection of ammonia causes a high rate of NOx reduction without the introduction of unneeded amounts of ammonia, with little or no slippage. "Slippage" refers to ammonia that is not fully utilized in the process of reducing NOx, and is then released into the atmosphere. Slippage is mostly a problem in systems in which a steady quantity of ammonia is injected into an exhaust system. With stationary, steady state heavy-duty engines, it is possible to inject a known steady quantity of ammonia without much slippage. But with mobile sources, or non-steady-state sources, the state of the engine is constantly changing, along with the amount of NOx and particulates being produced. If a steady quantity of ammonia is injected, the possibility of slippage is greater: any time very little NOx is being produced, too much ammonia could be injected into the system, with the inevitable result of significant slippage.

Another feature of the present invention is its ability to act as a combination SCR/SNCR emission control system. For example, one embodiment of the present invention may include an ammonia nozzle that is placed into the exhaust pipe 31 at the exhaust manifold 30. The higher temperature exhaust will react with the ammonia, even without a catalyst (the SNCR component). As the exhaust emissions continue through the exhaust pipe a secondary reaction occurs within the oxidation and reduction catalyst (the SCR element 19). Because of this dual reactive function as both a SNCR and SCR system, the present invention is capable of reducing NOx emissions over the entire range of temperatures (from 1200 F to 250 F) at which a typical mobile engine will operate. Therefore, all NOx emissions produced, regardless of operating temperature, will be reduced by the present invention.

The present invention can achieve large reductions of NOx emissions from vehicles powered by diesel engines, however, other embodiments of the invention will work equally well with vehicles powered by gasoline and natural gas. The present invention can also be incorporated into new engine designs with additional benefits. For example, incorporation of the present invention may result in reduced consumption of petroleum through the use of revised injection/compression timing. Where appropriate, particularly on new OEM diesel engines, the elimination of the exhaust gas recycle (EGR) component on a new engine can increase operating performance, thereby reducing fuel consumption.

In addition, the installation of the present invention will permit an engine to be adjusted to run leaner, should the owner, distributor, or OEM so desire, thereby saving fuel, without unduly increasing NOx or other emissions. It is estimated that a reduction in fuel consumption of about 8% may be achieved. Also, the engine compression ratio may be increased, resulting in greater power, again without unduly increasing emissions of NOx or PM. This could result in a savings in fuel operating costs of about 8%.

In a preferred embodiment, the present invention utilizes the injection of ammonia that will be supplied to the system from a replaceable and/or refillable DOT approved tank similar to those used to contain propane, which is released into the exhaust stream by a pressure regulator, or ammonia injection nozzle. As NOx is being created, fuel flow, and other sensors send signals to the controller that directs the $NH_3$ solenoid valve to open, thereby dispersing the ammonia, in a proportion necessary to effectively eliminate the NOx being created. Approximately 0.25 to 0.5 pounds of ammonia is consumed for each pound of NOx reduced. Conventional and readily available liquid ammonia may be emplyed to achieve the projected and anticipated levels of reduction of NOx and other harmful emissions. Alternative embodiments may use other forms of ammonia such as urea or aqueous ammonia.

The principles of the present invention can work equally well on engines powered by gasoline, natural gas or diesel, without any change or modification in the fuel. The present invention should be attractive to the target market sector of owners of fleets of heavy-duty diesel vehicles for the following reasons: 1) the technology will be easy to add-on, as a retrofit kit; 2) the technology will not reduce engine efficiency or power, and will not increase operating fuel costs; 3) fleet owners may be able to realize savings of 5-8% in fuel costs; 4) the technology will allow fleet owners to comply with federal clean air regulations; 5) fleet owners may become eligible for trading credits, which they can sell on the open market; 6) and because of the extremely cost-effective nature of the present invention (approximately $3,283 per ton of NOx reduced compared to $15,000+ per ton average price during 2000), the cost to the fleet owner of installing the proposed technology will be minimized.

Referring to FIG. 2, an emission control system is provided with controller 1 having radio frequency (RF) signal output 30 and a plurality of sensors including exhaust back pressure sensor 32, throttle position sensor 34 and engine RPM sensor 36. Throttle position sensor 34 supplies information regarding fuel flow (throttle position), and together with engine speed represents engine load. According to further embodiments of the invention, additional sensors are provided such as exhaust gas temperature sensors, an intake air temperature sensor, an engine load information sensor, a turbo boost sensor, an $NH_3$ temperature sensor and an NOx sensor.

The Environmental Protection Agency (EPA) is concerned with ensuring that drivers of vehicles equipped with an emission control system (such as described herein) will properly use the system. A driver that uses the emission control system will reduce pollution while driving and will receive pollution credits. However, once the system is installed and operational, there still remains several problems to be solved, including: (1) how to ensure that there is ammonia in the tank; (2) how to ensure that the system is actually reducing NOx emissions; (3) how to police that the system is being used; and (4) how and when will the ammonia tank be refilled when empty. Advantageously, the RF signal output 30 provides a solution to all of these problems.

RF signal output 30 may comprise an RF transmitter used to transmit important operational data regarding the amount of ammonia used and the amount of NOx reduced. For example, this information may be transmitted to remote locations and/or government agencies. The ability to transmit information wirelessly is particularly desirable in geographic areas where it is important to know how much NOx emissions are being reduced on a real-time basis. The information is employed to police that the system is being applied, using the distribution of pollution credits, which can be traded and sold, to encourage compliance.

The controller 1 calculates an amount of NOx reduced based on the amount of ammonia injected by the ammonia injector. In general, approximately 1 mole of ammonia will reduce approximately 1 mole of NOx. Information concerning of the amount of NOx reduced is helpful in monitoring the amount of ammonia used such that it is possible to estimate the time when the ammonia tank 14 will become empty. When the ammonia tank is nearly empty, the emission control system notifies an appropriate party to fill the tank as soon as practicable. In this manner, it is possible to ensure that ammonia tank 14 never becomes empty during engine use, thereby reducing pollution in the form of NOx emissions.

In operation, controller 1 calculates and maintains a running account of the amount of ammonia used and the amount of ammonia remaining in the tank. In particular, controller 1 initially checks the pressure in the ammonia tank 14 to ensure that it contains ammonia, wherein a lack of pressure indicates that the tank is substantially empty. The controller 1 then reads the pulse-width and frequency of the opening/closing of the ammonia injector as well as the pressure of the ammonia to calculate how much ammonia is being used. In other words, a predetermined injector opening time at a predetermined pressure and pulse frequency is indicative of a certain amount of ammonia mass. Since the mass of the initial amount of ammonia in the tank 14 is a known quantity, one can estimate when the tank 14 will become empty based upon the amount of ammonia used in operation. Of course, when the ammonia tank 14 is empty, no pollution is reduced and the tank 14 should be filled as soon as practicable. According to some embodiments of the invention, the tank is refilled when there is still a small amount of ammonia in the tank such that the system never ceases reducing the NOx emissions.

Figure 3:
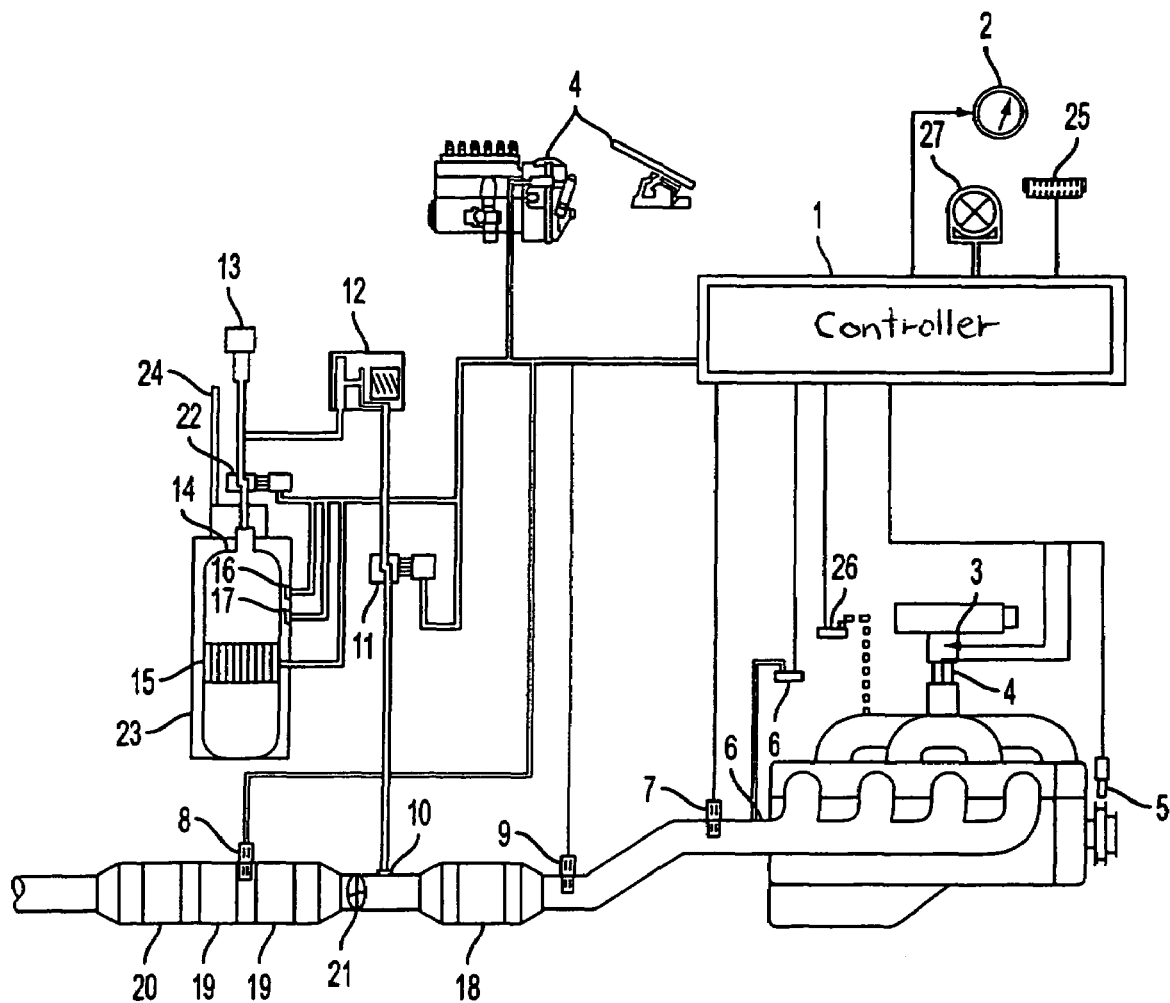
FIG. 3 is a schematic illustration of a third embodiment of an emission control system constructed according to the present invention.

Illustrated in FIG. 3, one embodiment of the present invention is comprised of sensors for exhaust gas temperature 7, 8, intake air temperature 3, engine load information, turbo boost 26, throttle position 4, engine rpm 5, exhaust back-pressure 6, $NH_3$ temperature 17, a NOx sensor 9, ammonia bottle, or tank heater 15, electronic controller 1, the SCR catalysts 19, a pre-catalyst 18 and a slip-catalyst 20. The controller 1 is responsible for controlling the amount of ammonia being injected for NOx reduction, while minimizing any ammonia slip, and may also include circuitry for a redundant fail-safe and OBD (On Board Diagnostic) system that may include a warning light 27, and a data port 25.

The controller 1 calculates the correct amount of ammonia needed, by analyzing the information supplied by the various sensors, together with the engine speed information, and compares these values with the appropriate point of the injection map that is contained in the vehicle's original engine control system. The amount of ammonia being injected is controlled by an ammonia metering solenoid, or other suitable valve 11 that introduces the ammonia into the exhaust system at a location before the SCR converters 19, but after the pre-converter 18 (see FIG. 3).

The controller 1 includes at least one general purpose digital computer with associated computer code, or logic for analyzing the data received from the sensors, and instructing the various components communicating with the controller 1.

Referring to FIGS. 5-8, several arrangements for introducing ammonia into the exhaust stream are illustrated. The ammonia nozzle 10 may comprise any of the following embodiments.

Figure 5:
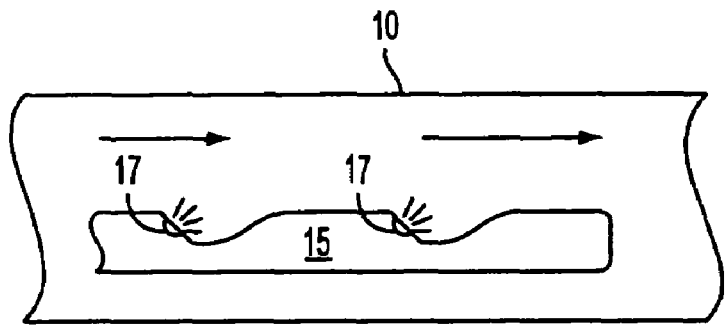
FIG. 5 is a side elevation view of one embodiment of an ammonia diffuser nozzle located in an exhaust pipe.
Figure 6:
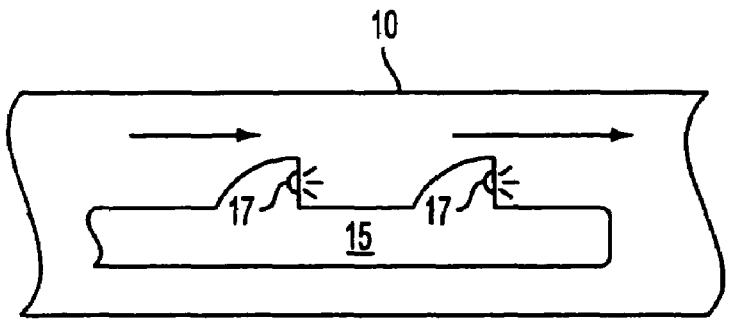
FIG. 6 is a side elevation view of another embodiment of an ammonia diffuser nozzle located in an exhaust pipe.

Specifically, in FIG. 5, an ammonia nozzle 15 is located within an exhaust pipe 10. The ammonia nozzle 15 includes at least two ports 17 that introduce ammonia into the exhaust stream. The ports 17 are inset below the contour of the nozzle 15, thereby minimizing any disruption in the flow of the exhaust stream and reducing the build-up of any particulate matter over the ports 17. Similarly, FIG. 6 illustrates an alternative nozzle 15 configuration. The ports are located on projections that extend from the nozzle 15. Because the ports 17 are facing downstream of the exhaust stream, particulate matter does not accumulate on the ports 17.

Figure 7:
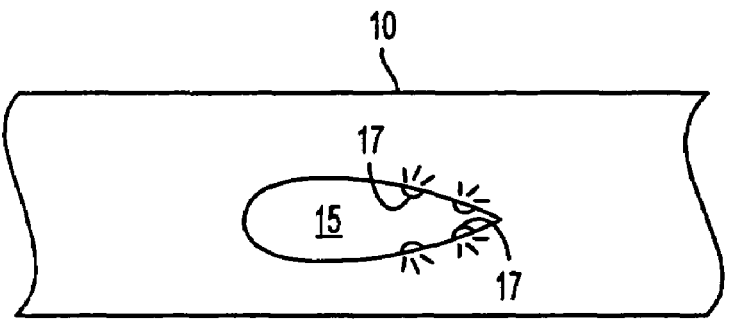
FIG. 7 is a side elevation view of yet another embodiment of an ammonia diffuser nozzle located in an exhaust pipe.

FIG. 7 illustrates an alternative nozzle 15 configuration. The nozzle 15 has a "teardrop" shape that minimizes drag in the exhaust stream and also minimizes particulate buildup over the ports 17.

Figure 8:
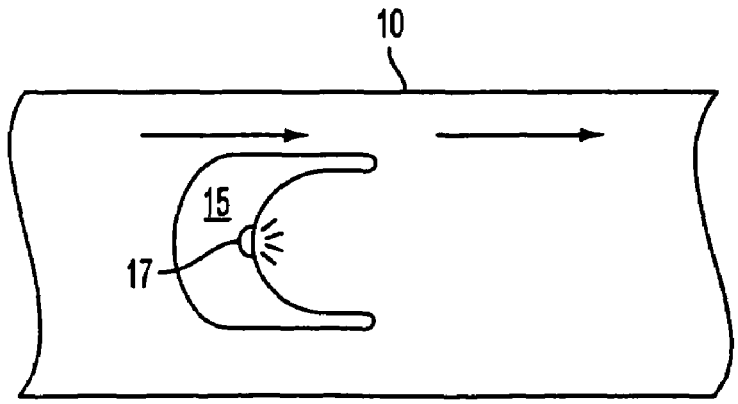
FIG. 8 is a side elevation view of a final embodiment of an ammonia diffuser nozzle located in an exhaust pipe.

Finally, FIG. 8 illustrates another embodiment of a nozzle 15. The nozzle 15 is substantially U-shaped and protects the port 17 from accumulation of particulates in the exhaust stream. It will be appreciated that other nozzle 15 configurations can be incorporated into the present invention to introduce ammonia into the exhaust stream of an exhaust pipe 10.

Any one of the above-described nozzle 15 configurations may also be designed to mix the ammonia with the exhaust stream so that the exhaust gases and ammonia are mixed together before reaching the various catalysts. This mixing may be facilitated by orienting the ports 17 in different directions, or the mixing may be accomplished by the insertion of a vortex generator or other type of device into the exhaust pipe. In addition, the present invention may include a device to direct the flow of the exhaust stream over the catalyst so the exhaust is disbursed evenly over the catalyst's surface. This device may include directing elements located in the exhaust pipe to direct the flow of the exhaust gases.

In addition, the present invention, may for example, includes a fail-safe system that detects any ammonia leaks. In a preferred embodiment, electromagnetic valves will assure shutoff of the ammonia supply in case of accidents or system malfunctions. Replacing or refilling of the ammonia tank 14 may be performed without any release of ammonia by employing of a quick-connect system.

As discussed above, the present invention employs multiple sensors operating with the controller 1. The controller 1 may obtain signals from some of, or all of the following sensors:

Crankshaft Sensor: Supplies information about engine speed and injection pulses.

Throttle Position Sensor: Supplies information about fuel flow (throttle position) and together with engine speed represents engine load.

Turbo Boost Sensor: Supplies information about engine load.

Exhaust Gas Temperature Sensors:

At Manifold: Supplies information about Exhaust Temperature right at the exhaust manifold. This information can be used to "predict" the creation of NOx. During heavy acceleration the exhaust temperature at the manifold changes more rapidly than at the converter. This information about "temperature-spread" can be used to adjust $NH_3$ flow during acceleration and deceleration.

At the Converter: Supplies information about Catalytic Converter Temperature and is used to compensate $NH_3$ flow depending on converter temperature (cold—no $NH_3$, hot—extra $NH_3$). This added feature results in greater NOx reduction and less chance for ammonia slip.

Exhaust Backpressure Sensor: Supplies information about Exhaust Backpressure. Excessive exhaust backpressure may be caused by a non-regenerating PM trap, or a clogged SCR catalyst or a clogged Pre-catalyst. (The vehicle operator may be warned by an audible and/or visual signal, or by an engine shut-down).

Intake Air Temperature Sensor: Since intake are temperature is directly affected by the production of NOx, this sensor supplies information about Intake Air Temperature and is used to compensate $NH_3$ flow.

$NH_3$ Line Temperature Sensor: This information is needed to enable reliable operation in all climate conditions. Since the mass of the ammonia changes with temperature, this sensor provides the $NH_3$ temperature.

NOx Sensor: The NOx sensor allows the system to operate in a closed-loop mode. This gives added controllability of the amount of ammonia being injected. This assures a short system reaction time during transient conditions and maximum emissions reduction.

$NH_3$ Tank Temperature Sensor: This information is needed to enable reliable operation in all climate conditions. This information is used to control the ammonia tank heating element.

$NH_3$ Tank Pressure Sensor: This sensor, in combination with the pulse-width information of the injector, determines if the system is being used and if ammonia is being consumed. In case the system is not being used, or the ammonia tank is empty, the use of the vehicle can be prohibited. (A vehicle operator warning may include: an audible and/or visual signal, or engine shutdown after 3 restarts). This sensor is also used for ammonia leak detection in a catastrophic event and system shutdown.

The controller 1 may send signals to the following units:

$NH_3$ Injector: Receives pulse-width signals from the controller for accurate $NH_3$ delivery.

$NH_3$ Shut-Off Valve: Isolates the high-pressure $NH_3$ in the tank from the rest of the system. The Shut-off valve is only open when the engine is running. Also controls system shutdown in case of Ammonia leak detection (rapid drop in pressure).

Diagnostic Light and Error Codes: The controller is equipped with self-diagnostic logic. The system will inform the operator or technician which sensor is malfunctioning by flashing a light in the dashboard. The vehicle must go to an authorized service center where the problem can be repaired and the Diagnostic Light reset.

The present invention may also include the following components:

Pressure Regulator: Accurately regulates $NH_3$ pressure.

$NH_3$ Tank Heater: Works with the $NH_3$ Tank Temperature Sensor and regulates $NH_3$ temperature under cold climate conditions.

Pre-Catalytic Converter: Removes substantial amounts of HC and CO and encourages the formation of $NO_2$. The presence of up to 50% $NO_2$ in the exhaust stream increases the efficiency of the SCR catalysts.

SCR Converter: The formulation of the "wash coat", as well as the Catalytic Converter sizing, is an important feature of the present invention.

Ammonia Slip Converter: The Ammonia Slip Converter can be considered a cleanup-catalyst and reduces any ammonia from the exhaust stream unused by the SCR.

Catalyzed Diesel Particulate Trap: Removes soot particles from the exhaust stream and when used in place of the Pre-Catalytic Converter, removes substantial amounts of HC and CO and encourages the formation of $NO_2$. The presence of up to 50% $NO_2$ in the exhaust stream increases the efficiency of the SCR catalysts.

Fast response $NO_x$/$NH_3$ Sensors: fast response $NO_x$ or $NH_3$ sensors may be used as feedback sensors, with the data sent to the controller 1 to optimize NOx reduction.

Figure 4:
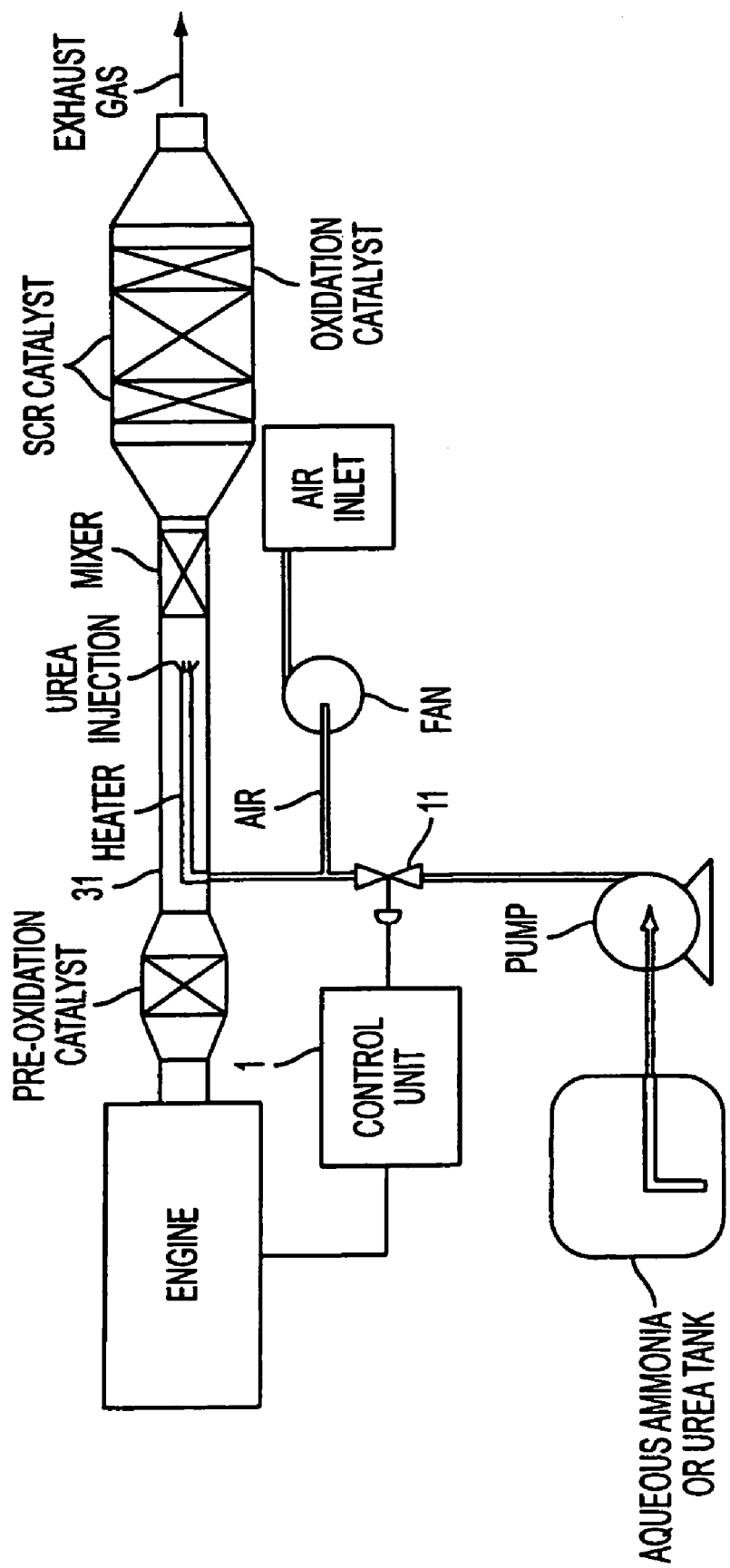
FIG. 4 is a schematic illustration of a fourth embodiment of an emission control system constructed according to the present invention.

As shown in FIG. 4, the present invention may also include some of the following components for an emission control system using urea or aqueous ammonia: an air fan or pump to help vaporize the ammonia; a liquid pump to pressurize the urea or aqueous ammonia; and a heater to heat the urea or aqueous ammonia. The heater may comprise an ammonia-carrying tube that is wound about the inner diameter of the exhaust pipe 31, or it may comprise a heating element that heats the urea or aqueous ammonia.

In the embodiment illustrated in FIG. 4, the urea or aqueous ammonia ($NH_3 \cdot H_2O$) is stored in a pressurized tank. From there it is piped through the pump to the ammonia metering solenoid. From there the ammonia, which in this embodiment uses ammonia in a water solution at about 27% to about 32% ammonia. To liberate the ammonia from the water/ammonia solution, at least two options are available: The water/ammonia solution is routed through the heater, schematically illustrated in FIG. 4. The heater may comprise a heating mechanism where the temperature is hot enough to turn the water into steam and liberate the ammonia as ammonia gas. This can be achieved by routing the water/ammonia mixture through a coiled metal tube, which is placed inside the exhaust pipe 31 as discussed above. The length of the coiled pipe can be increased or decreased and the location of the pipe can be optimized to liberate the ammonia from the water/ammonia mixture. Alternatively, the water/ammonia solution is routed through a tubular electric (or other shape) heater where the temperature is hot enough to turn the water into steam and liberate the ammonia as a gas. The length of the tubular electric (or other shape) heater (heating element) can be increased or decreased and the heating power can be increased or decreased so that the temperature is optimum to liberate the ammonia from the water/ammonia mixture.

The ammonia and water vapor is next routed into the exhaust pipe 31 where it mixes with the exhaust gas stream at a location upstream of the SCR catalyst. A mixer may be placed in the exhaust pipe 31 to aid in the mixing of the exhaust gases with the ammonia.

Generally, once routed through the heater element the urea undergoes hydrolysis and thermal decomposition producing ammonia. This hydrolysis continues when the urea/aqueous ammonia mixes with the hot exhaust gas. The mixture of exhaust gases and ammonia (decomposed urea/aqueous ammonia) enters the SCR catalyst where nitrogen oxides are reduced to nitrogen.

One feature of the present invention is that the controller 1 also monitors the exhaust gas temperature. When the temperature drops below a predetermined value, somewhere between about 150° C. to about 250° C., depending on the catalyst type and configuration, the controller 1 closes the urea supply to prevent catalyst deactivation and secondary emissions (ammonia slip) that may occur at low temperatures.

In a preferred embodiment of the present invention, the controller 1 calculates the correct amount of ammonia needed, by "reading" the information supplied by the various sensors, together with the engine speed information, and compares these values with the appropriate point of the factory-programmed Injection-Map. A fail-safe system assures that possible ammonia leaks do not go undetected and the on-board-diagnostic (OBD) system alarms the vehicle operator of any problems. Electromagnetic valves, or a shut-off solenoid 22 assures the auto-shutoff of the ammonia supply in case of accidents or system malfunctions. Replacing or refilling of the ammonia tank 14 is performed entirely without any accidental release of the reducing agent by using quick-release connectors.

Another embodiment of the present invention may account for changes to the ambient temperature. Generally, a change in ammonia storage pressure, caused by changes to ambient temperature, will change the amount of ammonia being delivered. In addition, the vapor pressure of ammonia changes with the increase or decrease of the ammonia temperature and therefore, in cold climates, a heater for the ammonia tank 14 may be necessary. For example, a blanket-type heater, which may be controlled by the controller 1, could maintain the ammonia at a temperature of about 80 to about 110 degrees F at all times.

One embodiment of the present invention may employ an open-loop configuration where a pre-programmed map of engine $NO_x$ emissions is used to control the ammonia/urea/aqueous injection rate as a function of engine speed, load, exhaust temp, intake air temp, an other parameters. This open-loop configuration is generally capable of about 80% $NO_x$ reduction. However, an alternative embodiment, employing a closed-loop system may be employed for more demanding applications requiring 90%+$NO_x$ reduction targets. The closed-loop system may require $NO_x$ sensors of 40-20 ppm $NO_x$ sensitivity having low cross-sensitivity to $NH_3$ for closed-loop operation. The use of a closed loop system may also minimize the amount of engine calibration work that is generally required in the development of open-loop systems.

The above-described invention includes several features including: monitoring if the system is being used and how much ammonia is being consumed; a self-diagnostic logic; ammonia leak detection; exhaust backpressure monitoring; data storage and system monitoring; and a Diagnostic Port for Runtime Data and System Information that can be accessed with a portable computer. All the system perimeters of the present invention are adjustable, and the present invention also incorporates easy and safe removal and replacement of ammonia containers.

In addition to the above-described controller and associated sensors, the present invention also employs several catalysts. Referring to FIG. 3, one embodiment of the present invention may employ three different catalysts in series: a diesel oxidation catalyst, or pre-catalyst 18, a SCR catalyst 19 and a guard oxidation catalyst or ammonia slip converter 20.

The ammonia is introduced into the exhaust pipe between the pre-catalyst 18 and the SCR 19. The ammonia then reacts on the SCR catalyst with the NOx present in the exhaust gas to form nitrogen ($N_2$). Finally, the ammonia slip converter 20 eliminates any secondary emissions of ammonia during dynamic operation.

In the SCR catalyst, ammonia reacts with NOx according to the following reactions:

$$4NH_3+4NO+O_2 => 4N_2+6H_2O \quad (3)$$

$$2NH_3+NO+NO_2 => 2N_2+3H_2O \quad (4)$$

$$4NH_3+2NO_2+O_2 => 3N_2+6H_2O \quad (5)$$

Of these three reactions, reaction (4) is appreciably more facile than either reaction (3) or (5), occurring at a significant rate at much lower reaction temperatures. Thus, if an appreciable proportion of the NOx in the exhaust consists of $NO_2$ (ideally 50%) the SCR catalyst will perform much more efficiently. For this reason, the present invention may include a pre-catalyst 18, shown in FIG. 3. The pre-catalyst 18 enables a significant improvement in the low temperature NOx removal performance of the present invention. This technology enables simultaneous NOx conversions of 75-90% and PM conversions of 75-90% to be obtained on existing engines.

In the ammonia slip converter catalyst 20, ammonia reacts with NOx according to the following reactions:

$$4NH_3+3O_2 => 2N_2+6H_2O$$

$$4HC+5O_2 => 4CO_2+2H_2O$$

$$2CO+O_2 => 2CO_2$$

Generally, a SCR catalyst is a homogenous, extruded base metal catalyst ($TiO_2$—$V_2O_5$—$WO_3$). In a preferred embodiment of the present invention, the SCR catalyst may use a 100 to 400 cpsi ceramic substrate coated with a $V_2O_5/WO_3/TiO_2$ mixture.

In summary, the present invention reliably and instantaneously introduces the correct amount of ammonia to the exhaust gas stream in order to efficiently reduce the amount of noxious NOx. In addition, the present invention synergistically arranges several catalytic converters and particulate traps to achieve a significant reduction in NOx, CO and particulate matter emissions.

Thus, it is seen that an emission control system is provided. One skilled in the art will appreciate that the present invention can be practiced by other than the preferred embodiments, which are presented in this description for purposes of illustration and not of limitation, and the present invention is limited only by the claims that follow. It is noted that various equivalents for the particular embodiments discussed in this description may practice the invention as well.

What is claimed is:

1. An emission control system for an engine for reducing NOx emissions, comprising:
    an ammonia injector;
    a controller for controlling the ammonia injector that calculates an amount of NOx reduced based on an amount of ammonia injected by the ammonia injector; and
    a catalyst;
    wherein the controller includes a transmitter for transmitting information regarding the amount of ammonia used and the amount of NOx reduced.

2. The emission control system of claim 1, wherein the transmitter is an RF transmitter configured to transmit the information to remote locations.

3. The emission control system of claim 1, wherein the transmitter is an RF transmitter configured to transmit the information to government agencies.

4. The emission control system of claim 1, wherein the information transmitted by the transmitter is used to ensure that the system is being properly employed.

5. The emission control system of claim 1, wherein the information transmitted by the transmitter is employed to determine a proper distribution of pollution credits to encourage compliance.

6. The emission control system of claim 1, wherein information concerning the amount of NOx reduced is employed to monitor an amount of ammonia used, such that it is possible to determine a time when the ammonia will be exhausted.

7. The emission control system of claim 1, wherein the controller notifies an appropriate party to fill the tank when the ammonia is nearly exhausted.

8. The emission control system of claim 1, wherein the controller calculates and maintains a running account of an amount of ammonia used and an amount of ammonia remaining in the tank.

9. The emission control system of claim 1, wherein the catalyst is selected from a group consisting of: a pre-catalytic converter, a selective catalytic reduction converter, and an ammonia slip converter.

10. The emission control system of claim 1, further comprising an ammonia shut-off valve that is controlled by the controller.

11. An emission control system for and engine for reducing NOx emissions, comprising:
    an ammonia tank;
    an ammonia injector; and
    a controller for controlling the ammonia injector;
    wherein the controller includes a transmitter for transmitting information regarding the amount of ammonia used and the amount of NOx reduced and wherein the controller determines a pulse-width and frequency of an opening and closing of the ammonia injector, as well as a pressure of the ammonia, in order to calculate an amount of ammonia being used.

12. The emission control system of claim 11, wherein the controller determines a pressure in the ammonia tank to ensure that it contains ammonia.

13. The emission control system of claim 11, wherein a lack of pressure in the ammonia tank indicates that the tank is substantially empty.

14. The emission control system of claim 11, wherein the ammonia tank is refilled when there remains an amount of ammonia in the tank.

15. The emission control system of claim 11, wherein the engine is selected from the group consisting of: a gasoline engine; a diesel engine; a natural gas engines; a spark-ignition engine; and a compression-ignition engine.

16. The emission control system of claim 11, wherein the transmitter is an RF transmitter configured to transmit the information to government agencies at remote locations.

17. The emission control system of claim 11, wherein the controller calculates an amount of NOx reduced based on an amount of ammonia injected by the ammonia injector.

18. The emission control system of claim 17, wherein information concerning the amount of NOx reduced is employed to monitor an amount of ammonia used, such that it is possible to determine a time when the ammonia will be exhausted.

* * * * *